United States Patent [19]

Jones

[11] 4,268,344

[45] May 19, 1981

[54] METHOD AND APPARATUS FOR COUPON INSERTION

[75] Inventor: Elwyn D. Jones, Kingston, Canada

[73] Assignee: Glopak Industries Limited, Montreal, Canada

[21] Appl. No.: 68,064

[22] Filed: Aug. 20, 1979

[51] Int. Cl.[3] ........................ B32B 31/00; B32B 3/00; B32B 31/04; B65C 9/40

[52] U.S. Cl. ...................................... 156/383; 156/70; 156/292; 156/227; 156/522; 156/552; 156/362; 53/553

[58] Field of Search ............... 156/227, 300, 301, 516, 156/290, 292, 554, 553, 552, 555, 522, 383, 70, 497, 65, 362, 363, 213, 265, DIG. 40, DIG. 105; 40/2 R; 53/553; 100/168, 170, 222, 223, 224

[56] References Cited

U.S. PATENT DOCUMENTS

| | | | |
|---|---|---|---|
| 2,524,417 | 10/1950 | Bamber | 156/DIG. 31 |
| 2,794,479 | 6/1957 | Ganz | 156/552 |
| 3,453,169 | 7/1969 | Buck et al. | 156/555 |
| 3,708,106 | 1/1973 | Sargent | 156/70 |
| 3,762,628 | 10/1973 | Sargent | 156/70 |
| 3,998,135 | 12/1976 | Sargent | 156/290 |

*Primary Examiner*—John T. Goolkasian
*Assistant Examiner*—L. Falasco

[57] ABSTRACT

Method and apparatus for positioning and securing a coupon within a transparent plastic bag in visible but tamper-proof manner. During manufacture of the bag a coupon is positioned against the inner surface of one side of the bag and the coupon is then overlaid with a cover strip which is heat sealed to the side of the bag. The bag is then completed and the coupon is held within the bag by the cover strip.

3 Claims, 6 Drawing Figures

METHOD AND APPARATUS FOR COUPON INSERTION

The present invention relates to method and apparatus for positioning a coupon or other insert within a bag which is to be subsequently filled.

More particularly, the invention relates to method and apparatus for positioning and securing a coupon to plastic bag material during manufacture of the bag so that the coupon is positioned and securely held within the bag.

In the following description and claims reference is made to a coupon and use of this word is meant to include a coupon or slip redeemable upon the purchase of similar or other products, or may be a guarantee slip or instruction sheet and in this specification a coupon is broadly considered as being any insert usually of paper which it is desired to pass to a consumer as a result of purchase of the accompanying mechandise.

The production of bags of thin plastic material such as polyethylene is very well known, and the material from which these bags are made is usually single ply, which after printing (if such is desired) is carried by rollers through folding and sealing stations wherein the final bags are prepared. Such bags are useful as packaging for various products such as bread, buns, milk pouches, and the like, all in conventional manner.

It is often desired to include in such bags redeemable coupons or the like to promote further purchasing and for advertising but manual insertion of coupons is a slow and time-consuming job, and generally such a procedure slows productivity as the bag and the filling thereof are usually accomplished by high speed automated machinery. Bags carrying bread, buns, milk pouches, and the like are usually closed by easily removable ties or plastic clips, and the simple insertion of a loose coupon into such bag prior to closure leaves the coupons easily available for theft because it is such an easy job to open and reclose such bags.

The apparatus and method of this invention avoids these difficulties by securing the coupon directly to an inside surface of the bag during its manufacture which greatly speeds coupon placement and because of the securement of the coupon within the bag provides for a tamper-proof presentation.

In accordance with the invention, the coupon is positioned on bag material when the bag material is in opened and flattened form, and the coupon is then covered with a cover strip of thin plastic material which is then heat sealed to the bag material so that the coupon is completely enclosed between the bag material and cover strip. Because of the sealing of the cover strip over the coupon, subsequent filling of the bag is not hampered, and the coupon itself is isolated from the product in the bag by the cover strip, thus ensuring that the coupon never comes in contact with the product which will occur if the coupon is simply placed loosely in the bag with the product.

OBJECTS OF THE INVENTION

The principle object of the present invention is to provide apparatus and method for the positioning and covering of a coupon within a thin plastic bag during manufacture of the bag in such a manner that subsequent filling of the bag is not hampered or slowed due to the presence of the coupon.

A further object is to provide method and apparatus for the positioning and covering of a coupon within a thin plastic bag during manufacture of the bag and which provides for tamper-proof and theft-proof coupon presentation.

A still further object is to provide apparatus and method as described and where the coupon is positioned within the bag and is covered by thin plastic material so that the coupon never comes into contact with a product packaged in the bag.

More specifically, an object of the invention is to provide a method for positioning and securing coupons to plastic sheet bag material which is subsequently folded and sealed to form bags, comprising passing a continuous length of flattened bag material over first and second rollers during travel of the sheet material to subsequent stations where the bag material is folded and sealed and severed into final bag form, overlaying the travelling bag material with a continuous length of plastic cover strip material at a position adjacent the first roller, inserting coupons between the travelling bag material and the cover strip material at the position of overlay and passing the bag material and overlaid cover strip material having coupons positioned therebetween around the second roller, and heat sealing the cover strip to the plastic sheet material to secure the coupons therebetween.

Additionally, a specific object is to provide apparatus for positioning and securing coupons intermittently and sequentially on a travelling web of plastic sheet bag material which is subsequently folded and sealed to form a bag comprising at least first and second rollers supporting the web of bag material for movement in one direction, and a supply roll of plastic cover strip material for travelling overlay of the bag material with coupons intermittently positioned therebetween, the strip material passing around a third roller positioned above the first roller to overlay the cover strip material, the bag material and the overlay strip material then together passing around the second roller, the third roller being mounted for movement between a raised position spaced above the first roller to a lowered position bringing the travelling strip material into contact with the travelling bag material, and a supply magazine for coupons and a coupon transfer assembly for transferring single coupons sequentially from the magazine to a position where a leading edge of a coupon is between the first roller and the third roller when the latter roller is in its raised position, and means to lower the third roller to its lowered position where the leading edge of the coupon is engaged between the travelling webs and the coupon is carried along therebetween and around the second roller, and heat sealing means for sealing the strip material to the bag material with the coupons positioned therebetween.

BRIEF DESCRIPTION OF ACCOMPANYING DRAWINGS

DETAILED DESCRIPTION OF ACCOMPANYING DRAWINGS

Figure 1:
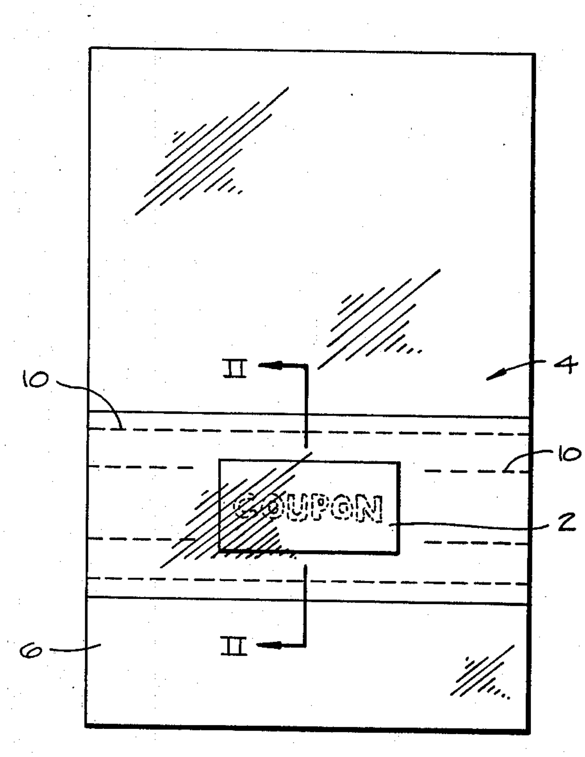
FIG. 1 illustrates in front view a bag of thin plastic material having a coupon secured in position on the inner surface of the front panel.
Figure 2:
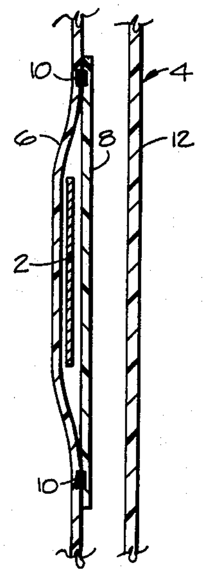
FIG. 2 is a sectional view taken along line 2—2 of FIG. 1.

FIG. 1 illustrates a coupon 2 positioned within a bag 4 and which bag is in completed form ready for filling. FIG. 2 is a sectional view taken along line 2—2 of FIG. 1, showing the coupon 2 held securely in position against the inner surface of the front panel 6 of the bag by a cover strip 8 which cover strip is secured to the inner surface of front panel 6 by heat sealed lines 10. The back panel of the bag is shown at 12.

FIG. 2 illustrates in perspective view apparatus for positioning the coupon 2 within bag 4 as illustrated in FIGS. 1 and 2.

In conventional manner, flattened single ply plastic material such as polyethylene is after printing (if desired) fed by various rollers to stations for folding and sealing to provide a bag such as shown in FIG. 1 but which, of course, does not contain a coupon. The single ply bag material may be of double width or triple width enabling simultaneous production of 2, 3 or more bags.

In the apparatus as shown in FIG. 1, single ply bag material 14 is carried around rollers 16, 20, 22, 24, 26, and 28, from a supply roll of plastic material (not shown) to further processing stations for folding, sealing, and like operations also not shown in the drawings because of their conventional nature.

One or more of the rollers 22, 24, 26, 28, may be rotatably driven as desired, the remaining rollers being idler rollers.

Positioned above and adjacent rollers 26, 28 is the coupon positioning and sealing apparatus in accordance with the present invention.

This apparatus consists basically of five component assemblies as follows:

1. Cover strip supply roll shown generally at 30;
2. A coupon magazine shown generally at 32;
3. A coupon transfer assembly shown generally at 34;
4. A snatch roll assembly shown generally at 36; and
5. A heat sealing assembly shown generally at 38.

Figure 5:
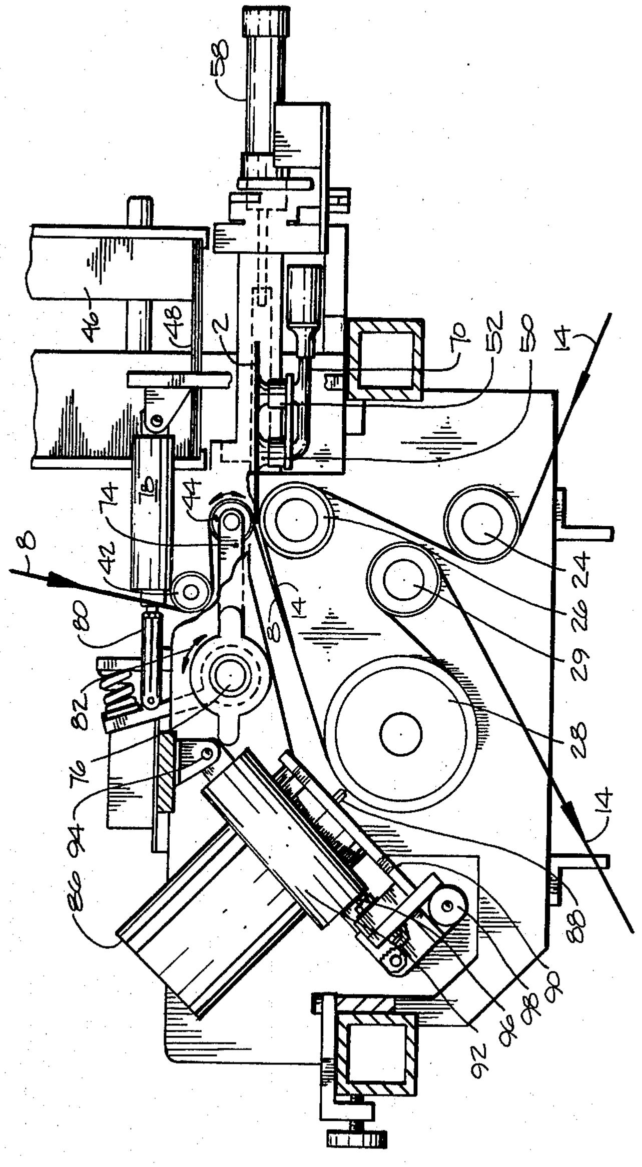
FIG. 5 illustrates in side view the apparatus as shown in FIG. 4.

Cover strip material 8 of a width somewhat greater than the width of the coupon 2 which is to be positioned and secured to the bag material 14 is supplied from cover strip supply roll 40, and this cover strip material 8 passes downwardly around idler roll 42, and then around snatch roll 44 (see FIG. 5) which positions the cover strip material in overlapping relationship with the travelling bag material 14; the movement of the bag material 14, and the cover strip material and their overlapping relationship being shown in attached FIG. 5, both materials being in overlapping relationship during travel around rollers 28 and 29 on the way to folding and sealing of the finished bag.

It is during the time of overlapping of the cover strip 8 to the bag material 14 that coupons are sequentially inserted in timed relationship in respect of bag material movement to correctly position the coupon on the material. Coupon supply may conveniently consist of an open top hopper 46 to receive a supply of coupons 2 as shown at FIGS. 3 to 6. The hopper may conveniently be inclined to urge the supply of coupons toward a lower open end of the hopper from which coupons are individually withdrawn. To hold the coupons within the hopper, suitable retainer plates 48 may conveniently be provided around the edges of the hopper to retain the supply of coupons therein until such time as coupons are individually and sequentially removed by an arrangement which will be discussed in more detail below.

Figure 3:
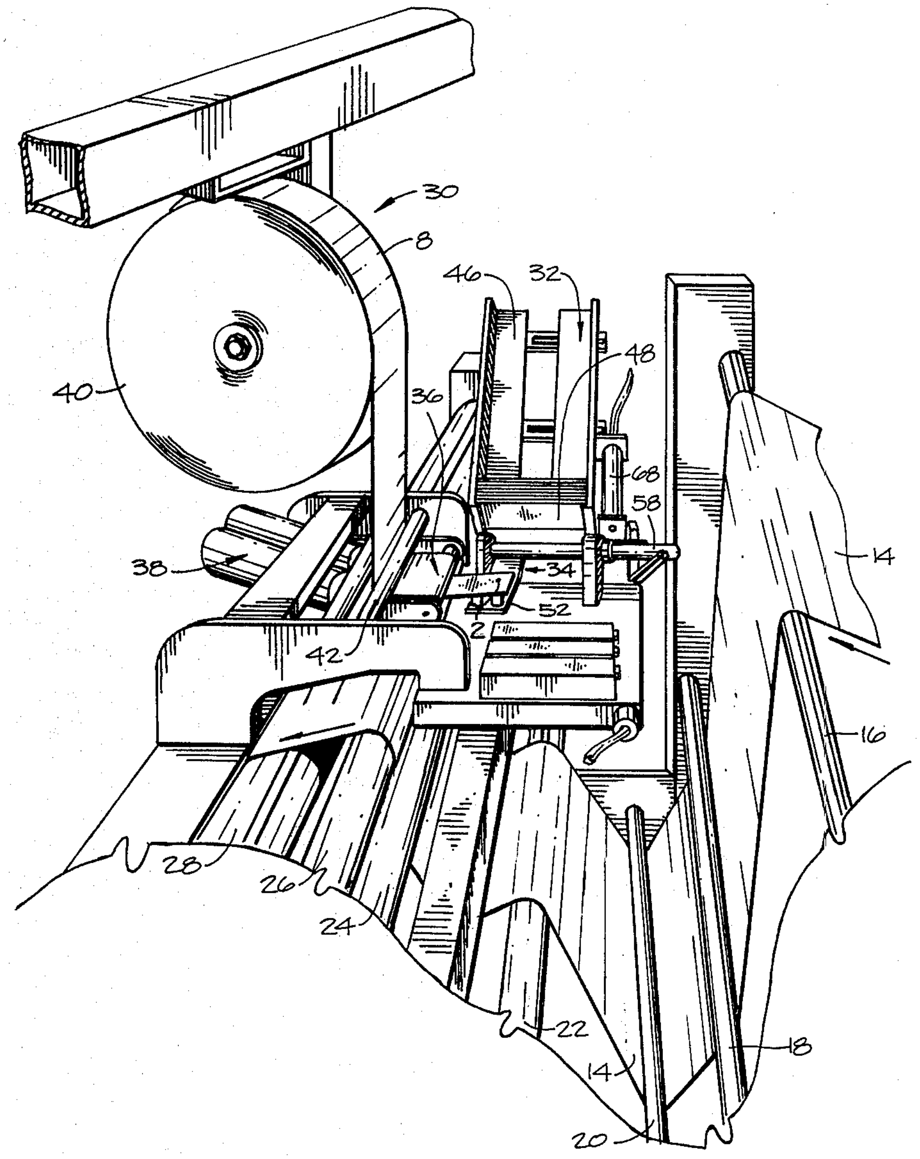
FIG. 3 illustrates in perspective view apparatus for positioning and securing a coupon to a bag during manufacture of the bag.

The coupons are individually and sequentially removed from the magazine and advanced to a position where the leading edge of a coupon is between rollers 26 and 44, and this transfer of coupons is accomplished by the coupon transfer assembly as shown generally by numeral 34 in FIG. 3. This coupon transfer assembly consists of one or more vacuum cups 50 which are carried on support arm 52 which in turn is securely fastened to a piston shaft extension 54 which at its inner end is secured to the piston rod 56 of an air cylinder 58. With this arrangement, it will be seen that extension and withdrawal of the piston rod 56 from and into numeratic cylinder will move the support arm 52 and vacuum cups 50 in reciprocal motion and to the extreme positions shown in FIG. 4, an advanced position being shown in full lines, and a retracted position being shown in broken lines.

Figure 4:
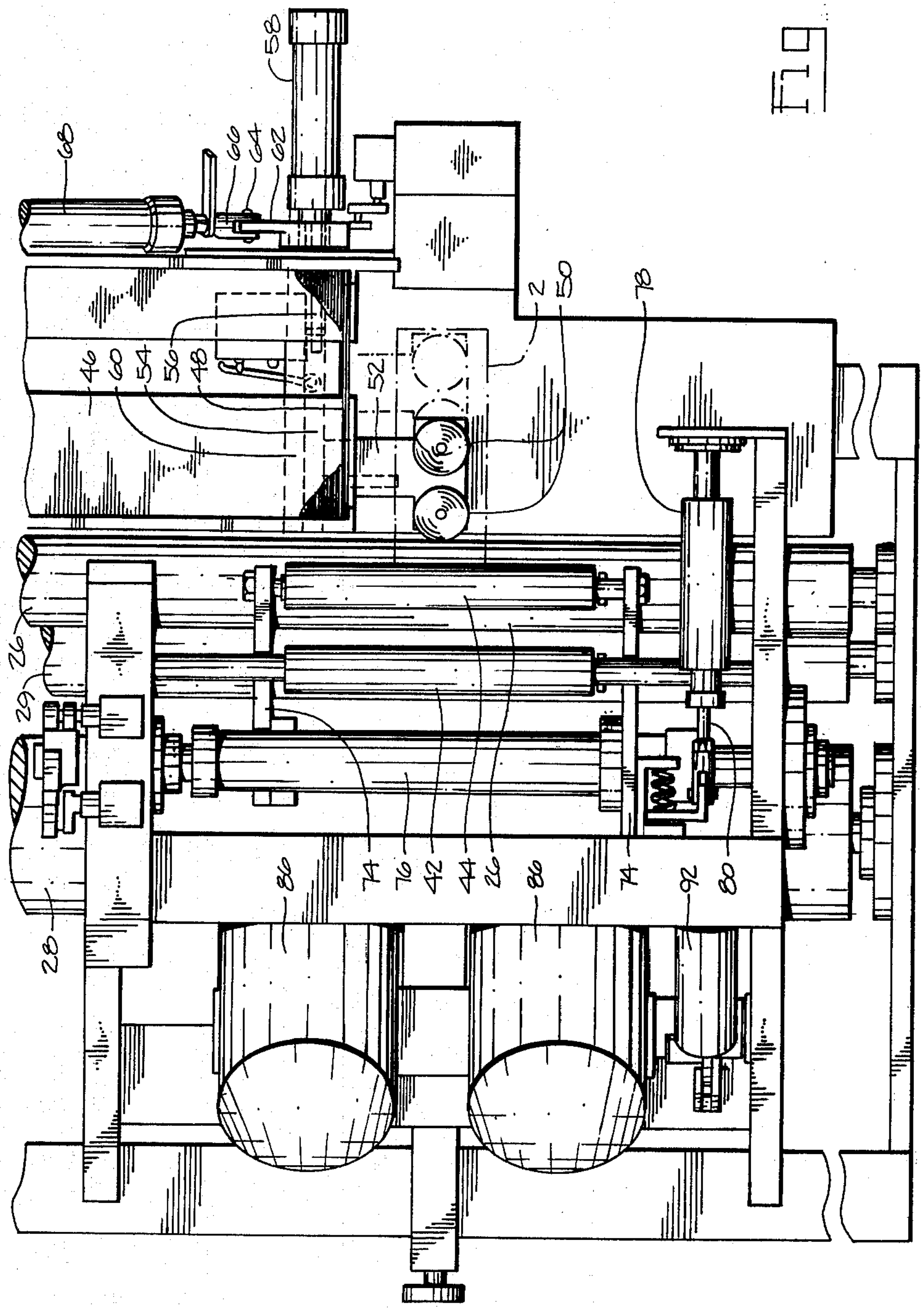
FIG. 4 illustrates in enlarged top view the coupon positioning and sealing assembly.
Figure 6:
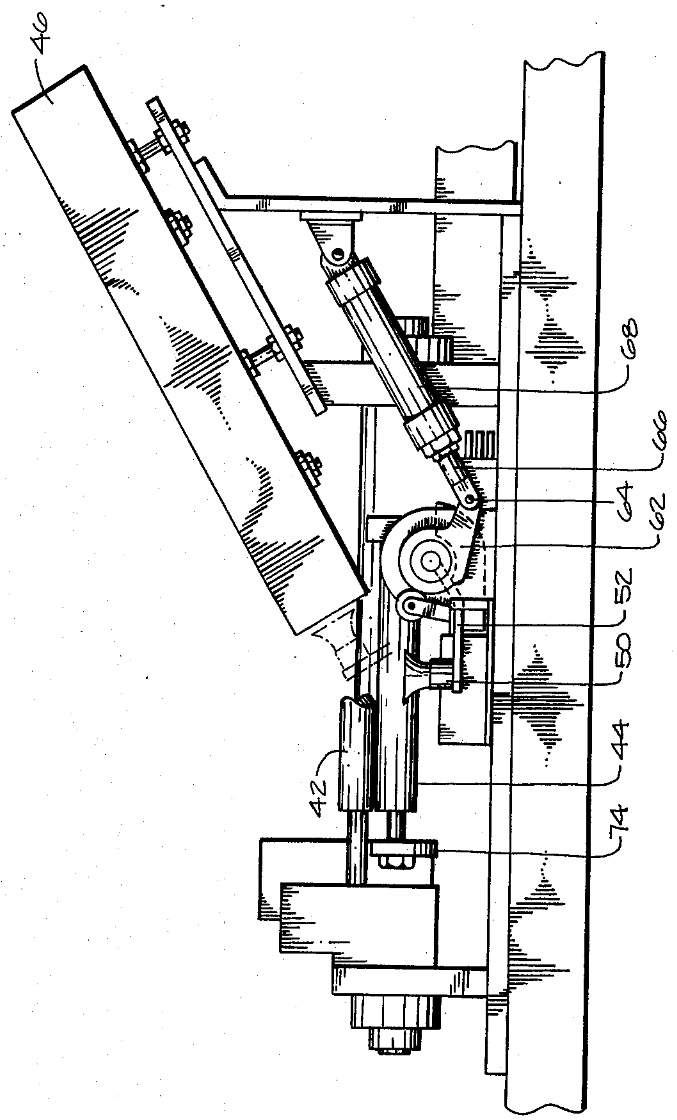
FIG. 6 illustrates a portion of the apparatus shown in FIG. 4.

Surrounding the piston extension is a rotatable rocker shaft sleeve 60, and secured to the rocker shaft sleeve is rocker shaft arm 62 which is pivotally secured at 54 to piston rod 66 of pneumatic cylinder 68. The rocker shaft sleeve 60 is provided with a longitudinally extending slot (not shown) through which support arm 52 projects and during extension and retraction of the piston shaft extension 54, the vacuum cup support arm 52 is free to move along within this slot. Extension and retraction of piston rod 66 within pneumatic cylinder 68 rotates the rocker shaft sleeve and this rotation results in a corresponding movement in the support arm 52 so that the support plate and carried vacuum cups are reciprocally movable from a lower position shown in full lines in FIG. 6 to an upper position shown in broken lines. The broken line positioning in FIG. 6 shows the support plate and vacuum cups 50 pivoted in an upward direction, thereby enabling the vacuum cups to contact and grasp the leading coupon in the coupon magazine. The application of partial vacuum to the suction cups by suitable means such as tubing 70 couples the leading coupon to the suction cups and retraction of piston rod 66 within cylinder 68 will then result in a lowering of the vacuum cup support plate to the horizontal position as shown in full lines in FIG. 6. During the removal of the first coupon from the coupon magazine, the retainer plates 48 hold the next and remaining coupons in position within the magazine. Upon the return of the vacuum cup support plate to the position shown in full lines in FIG. 6, pneumatic cylinder 58 is then operated to extend its piston rod 56 and move the vacuum cup and support plate and carried coupon to the forward position as shown in FIG. 4, and wherein the leading edge of the coupon is advanced to a position between rollers 26 and 44 wherein the coupon is ready to be grasped between the bag material 14 and the cover strip 8. The various movements of the coupon transfer assembly forward and backwards and upwardly and downwardly and the actuation of pneumatic cylinders 58 and 68 and the application and release of partial vacuum to the vacuum cups will be timed and indexed with respect to the movement of the bag wrapping material so that the coupon is positively positioned in exact position within the finished bag.

This indexing can be accomplished any number of ways. One suitable method is to provide the bag material with coloured index marks at spaced distances along one edge and providing means to detect the marks during travel of the web material, with the detection of the marks triggering movement of the various movable components.

With the coupon in the position as shown in FIG. 5, its leading edge is ready to be grasped between the bag material 14, and the cover strip 8. The grasping of the leading edge of the coupon is accomplished by the snatch roll assembly generally shown by numeral 36. A snatch roller 44 is rotatably carried by parallel arms 74 which are secured to snatch roller rocker shaft 76 which is rotatably carried by framing of the apparatus, and is rotatable by air cylinder 78 through air cylinder piston 80. Rotation of rocker shaft arm 76 reciprocably in the direction of the double arrow 82 (see FIG. 5) will result in roller 44 moving toward and away from roller 26. In the view as shown in FIG. 5, the snatch roller 44 is in its upper position spaced a distance above roller 26. Withdrawal of piston rod 80 into air cylinder 78 will, however, cause rotation of the snatch roll rocker 76 to lower snatch roller 44 toward roller 26 and this lowering results in contact with the leading edge of the coupon 2 and because of the continuously moving nature of the web material 8 and 14, the coupon is drawn from its position on the suction cups 50 towards a left in FIG. 5, and between material 8 and 14; it being understood that partial vacuum through the suction cups will be released upon actuation of the air cylinder 78.

The coupon is then held between webs 14 and 8 and the webs carrying the coupon then encircle sealing roller 28 and it is here that the cover strip is heat sealed to the bag web material to securely position the coupon.

This heat sealing is preferably accomplished by heat seal units 86 having air nozzles 88 through which heated air at a temperature of about 700°-800° F. is blown to effect sealing of the webs together along the lines shown as sealing lines 10 in FIG. 1. Sealing lines 10 are provided along side edges of the coupon as shown in FIG. 1, and to ensure that the coupon does not move longitudinally beneath the cover strip, and additional one or two central sealing lines may be provided as shown in FIG. 1. Four sealing lines 10 are shown in FIG. 1, and this specific sealing is obtained by providing each of the seal heads 86 with two air nozzles. The temperature used to form the sealing lines is sufficient to fuse the plastic cover strip and bag material together, but the plastic material does not adhere to the coupon (usually of paper or cardboard) so the coupon is readily accessible to the consumer upon removal of the cover strip.

The heat sealing units are of conventional construction being of generally cylindrical configuration having helical electrically heated hollow elements provided therein. Pressurized air is forced under pressure into the cylinder and this air passes along within the hollow cylindrical elements and issues from the nozzles 88 at suitable sealing temperature in the order of 700°-800° F.

This temperature is sufficient to fuse adjacent webs of plastic material, and provision may be made to move the sealing nozzles toward and away from sealing engagement with the web material should such ever become necessary. With coupons being positioned in adjacent bags, the heat sealing unit will continually be maintained in sealing contact with the web material. There may, however, be a lengthy run of bags which are not to contain coupons at all and in such case, feed from the cover strip supply will be discontinued, and it may be advantageous to withdraw the heat sealing heads from proximity with rollers 20.

This can advantageously be done by mounting the heat seal heads 86 on a plate 90, which is itself pivotally mounted on the framing, and controlled by an air cylinder 92. A suitable arrangement is shown in FIG. 4 with air cylinder 92 shown as being pivotally secured at one end to the framing at 94, and with the piston rod 96 of the cylinder being in contact with heat seal support plate 90, which plate is pivotally secured to the framing at 98. It will be appreciated that extension of the piston rod 96 from pneumatic cylinder 92 will cause the plate to rotate counterclockwise, thus moving the heat seal units and the heating nozzles 88 away from proximity with sealing roller 28.

After leaving the heat sealing assembly, the web carrying the coupons sealed thereon continues to conventional folding and sealing equipment for the final formation of the bag as shown in FIG. 1.

I claim:

1. Apparatus for positioning and securing coupons intermittently and sequentially on a travelling web of plastic sheet bag material which is subsequently folded and sealed to form a bag comprising at least first and second rollers supporting the web of bag material for movement in one direction, and a supply roll of plastic cover strip material for travelling overlay of the bag material with coupons intermittently positioned therebetween, the strip material passing around a third roller positioned above the first roller to overlay the cover strip material, the bag material and the overlaid strip material then together passing around the second roller, the third roller being mounted for movement between a raised position spaced above the first roller to a lowered position bringing the travelling strip material into contact with the travelling bag material, and a supply magazine for coupons and a coupon transfer assembly for transferring single coupons sequentially from the magazine to a position where a leading edge of a coupon is between the first roller and the third roller when the latter roller is in its raised position, and means to lower the third roller to its lowered position where the leading edge of the coupon is engaged between the travelling webs and the coupon is carried along therebetween and around the second roller, and heat sealing means for sealing the strip material to the bag material with the coupons positioned therebetween during travel around the second roller, the heat sealing means comprising sealing heads having heated air discharge nozzles positioned adjacent the second roller, the heated air sealing the bag material and overlaid cover strip material together along parallel lines of securement, two of the lines of securement being adjacent and parallel to side edges of the cover strip.

2. Apparatus according to claim 1, wherein the supply magazine comprises an inclined hopper holding the coupons in planar relationship with a surface of the lowermost coupon being exposed, the coupon transfer assembly comprising at least one suction cup mounted on a support plate secured to a shaft which is both rotatable and axially reciprocal, in a withdrawn and rotated position of the shaft the suction gup grasping the lowermost coupon as a result of partial evacuation of air from within the cup, reverse rotation and advancement of the shaft moving the coupon to a horizontal position having its leading edge between the first and third roller and in position for engagement between the travelling webs as a result of lowering of the third roller.

3. Apparatus according to claim 1, including at least one heated air discharge nozzle providing at least one further line of securement centrally between the adjacent and parallel lines of securement, the further line of securement passing over but not sealing the coupon to the plastic material.

* * * * *